United States Patent [19]
Henderson

[11] Patent Number: 5,751,090
[45] Date of Patent: May 12, 1998

[54] PERISTALTIC DRIVER APPARATUS

[75] Inventor: David A. Henderson, Farmington, N.Y.

[73] Assignee: Burleigh Instruments Inc., Victor, N.Y.

[21] Appl. No.: 752,730

[22] Filed: Nov. 19, 1996

Related U.S. Application Data

[63] Continuation of Ser. No. 442,738, May 17, 1995, abandoned.

[51] Int. Cl.$^6$ .................................................. H01L 41/08
[52] U.S. Cl. ............................................................ 310/328
[58] Field of Search .................................... 310/323, 328

[56] References Cited

U.S. PATENT DOCUMENTS

| | | | |
|---|---|---|---|
| 3,138,749 | 6/1964 | Stibitz | 318/135 |
| 3,377,489 | 4/1968 | Brisbane | 310/8.3 |
| 3,389,274 | 6/1968 | Robertson | 310/8 |
| 3,390,559 | 7/1968 | Steutzer | 70/275 |
| 3,649,856 | 3/1972 | O'Neill | 310/8.3 |
| 3,684,904 | 8/1972 | Galutva et al. | 310/8 |
| 3,902,084 | 8/1975 | May | 310/8.1 |
| 3,952,215 | 4/1976 | Sakitani | 310/8.1 |
| 4,163,168 | 7/1979 | Ishikawa | 310/328 |
| 4,219,755 | 8/1980 | O'Neill et al. | 310/348 |
| 4,408,832 | 10/1983 | Hartman et al. | 350/310 |
| 4,454,441 | 6/1984 | Taniguchi | 310/328 |
| 4,455,501 | 6/1984 | Tojo et al. | 310/328 |
| 4,468,583 | 8/1984 | Mori | 310/328 |
| 4,570,096 | 2/1986 | Hara et al. | 310/328 |
| 4,585,969 | 4/1986 | Tanaka | 310/328 |
| 4,622,483 | 11/1986 | Staufenberg, Jr. et al. | 310/328 |
| 4,651,046 | 3/1987 | Ohya et al. | 310/328 |
| 4,709,183 | 11/1987 | Lange | 310/328 |
| 4,736,131 | 4/1988 | Fujimoto | 310/328 |
| 4,777,398 | 10/1988 | Shibuya | 310/328 |
| 4,874,979 | 10/1989 | Rapp | 310/328 |
| 4,928,030 | 5/1990 | Culp | 310/328 |
| 4,947,077 | 8/1990 | Murata | 310/328 |
| 4,968,914 | 11/1990 | West et al. | 310/328 |

(List continued on next page.)

OTHER PUBLICATIONS

An Ultrahigh Vacuum Scanning Tunneling Microscope with a new Inchworm Mechanism, N. Shimizu et al; Fujitsu Laboratories Ltd.; J. Vac. Sci. Technol. A 8 (1) Jan./Feb. 1990, pp. 333–335.

Hoechst Ceramtec—Monolithic Multilayer Actuators (1994).

(List continued on next page.)

*Primary Examiner*—Mark O. Budd
*Attorney, Agent, or Firm*—M. LuKacher; K. LuKacher

[57] ABSTRACT

A peristaltic driver, also known as an Inchworm® actuator using stepping, "clamp-extend-clamp", action of a piezoelectric actuator device provides motion in high resolution (steps) of an object, such as a probe of a scanning probe microscope or other optical, electrical and computer elements. The actuator device is an integral body made up of successive pusher and clamping sections. The clamping sections selectively clamp to members which are spaced from each other. An object is moved along a path between the members by being coupled to a pusher section which is disposed in symmetrical relationship with pairs of other pusher sections and pairs of clamping sections. Voltages are applied across the various sections and provide clamping action without transferring net forces in directions along which the object is pushed, thus reducing motion discontinuities each time the clamping sections extend or retract. The members along which the actuator moves are biased to apply a constant spring pre-load against the clamping members thereby compensating for dimensional changes due to thermal expansion or contraction of the actuator and mechanical wear. Tensile stresses on the piezoelectric material are minimized in that forces are transferred via the clamping sections when they are under compression. In a preferred embodiment, seven sections are used each made of a multiplicity of layers of piezoelectric, ceramic material which are oriented generally paralleling the surfaces of the members for the clamping sections and generally perpendicular to these surfaces for the pusher sections. These sections are interconnected by ceramic material and form a monolithic, integral body.

17 Claims, 7 Drawing Sheets

U.S. PATENT DOCUMENTS

| | | | |
|---|---|---|---|
| 5,027,027 | 6/1991 | Orbach | 310/317 |
| 5,034,647 | 7/1991 | Ohtsuka | 310/328 |
| 5,043,621 | 8/1991 | Culp | 310/316 |
| 5,136,201 | 8/1992 | Culp | 310/328 |
| 5,237,238 | 8/1993 | Berghaus et al. | 310/328 |
| 5,319,257 | 6/1994 | McIntrye | 310/328 |
| 5,332,942 | 7/1994 | Rennex | 310/328 |
| 5,351,789 | 10/1994 | Tochihara et al. | 188/67 |
| 5,378,948 | 1/1995 | Richter | 310/328 |
| 5,404,066 | 4/1995 | Moriwaki et al. | 310/328 |
| 5,451,827 | 9/1995 | Takagi | 310/323 |

OTHER PUBLICATIONS

Morgan Matroc—Electronic Components and Piezo Ceramics (date unknown).

AUX–Kyocera—Electrostructure Actuators (1990).

Tokin—Multilayer Piezoelectric Actuator (1987).

NEC—Multilayer Piezoelectric Actuator (1992).

Fig. 6
Sequence Of Operation

FIG. 7
TIMING CHART: MOTION AND VOLTAGES

PERISTALTIC DRIVER APPARATUS

This is a continuation of application of Ser. No. 442,738 filed May 17, 1995, now abandoned.

DESCRIPTION

The present invention relates to peristaltic driver apparatus also known as a peristaltic actuator or motor and particularly to an improved Inchworm® motor.

Inchworm motors and actuators are exemplified by the linear translating devices shown in U.S. Pat. Nos. 3,902,084, 3,902,085 and 4,874,979. In such Inchworm® actuators or motors, a shaft coaxial with a piezoelectric actuating cylinder is clamped and moved along the axis of the cylinder when a section of the piezoelectric actuator is extended. Other Inchworm® actuators have peristaltic actuators disposed between members to which they clamp and move step-wise thereby moving an object coupled thereto. Such designs using a movable peristaltic actuator are shown in U.S. Pat. No. 3,777,489 and 3,684,904, for example.

While Inchworm® actuators and motors have been used successfully for many years to provide microscopic resolution motion in various instruments and devices, such as scanning probe microscopes, photolithographic steppers which are used to make integrated circuits and other delicate instruments, it is desirable that their reliability and life be increased and their cost reduced by reducing manufacturing tolerances on the parts thereof. It is also desirable to minimize motion discontinuities of the object being manipulated by reducing discontinuities in motions produced by the active elements of the actuator in directions other than desired. It is also desired to extend the range and increase the resolution of peristaltic actuators or motors and to provide versions of similar design for producing selected, larger or smaller, actuating forces on the object being moved.

It is believed that a significant cause of failure in peristaltic actuators arises from cracking and arcing of the clamping elements due to cyclic tensile stresses which can approach 3,000 psi at 1,000 Hz and high voltages, of the order of hundreds of volts. Such tensile stresses are particularly detrimental when applied to piezoelectric materials which are of a ceramic nature and are brittle. Thus, it is desirable to reduce the failure mode of cracking and arcing due to tensile stressing of the materials, thereby increasing the reliability and life of the apparatus.

Accordingly, it is the object of this invention to provide improved peristaltic motors or actuators wherein one or more of the foregoing difficulties or disadvantages are eliminated.

Briefly described, a peristaltic actuator or motor embodying the invention has the following features:

a. Elimination of tensile stresses in clamping sections of the actuator of the apparatus by providing fixed members inside of which the actuator is disposed and which are engaged by clamping sections of the actuator.

b. Eliminating high tolerance or precision fits between the actuator and these members by allowing at least one of the members to float on the active, extended clamping sections of the actuator by biasing the member with a constant pre-load force, preferably using a low stiffness spring.

c. Reducing the operating voltage for operating the actuator to extend the active sections thereof by forming the active sections of a multiplicity of layers of active material, which may be a ceramic material, which also connects the sections into an integral body.

d. Reducing motion discontinuities ("glitches") arising out of cross-coupling of motions, in directions (axial) along which the object moves, by arranging the clamping sections in pairs symmetrically with respect to the pusher section which provides motion of the object, such axial motion from each activated clamping section in a pair substantially equal being in opposite directions thereby tending to sum to zero glitch motion at the point on the pusher section between the clamping sections where the object is connected (the pick-off point).

It will be understood that not all, but only one or more of these features may be embodied in an improved peristaltic motor or actuator in accordance with the invention and the invention is not limited to designs which incorporate all such features.

The foregoing and other objects, features and advantages of the invention will be better understood from a reading of the following description in connection with the accompanying drawings in which.

DETAILED DESCRIPTION

Figure 1:
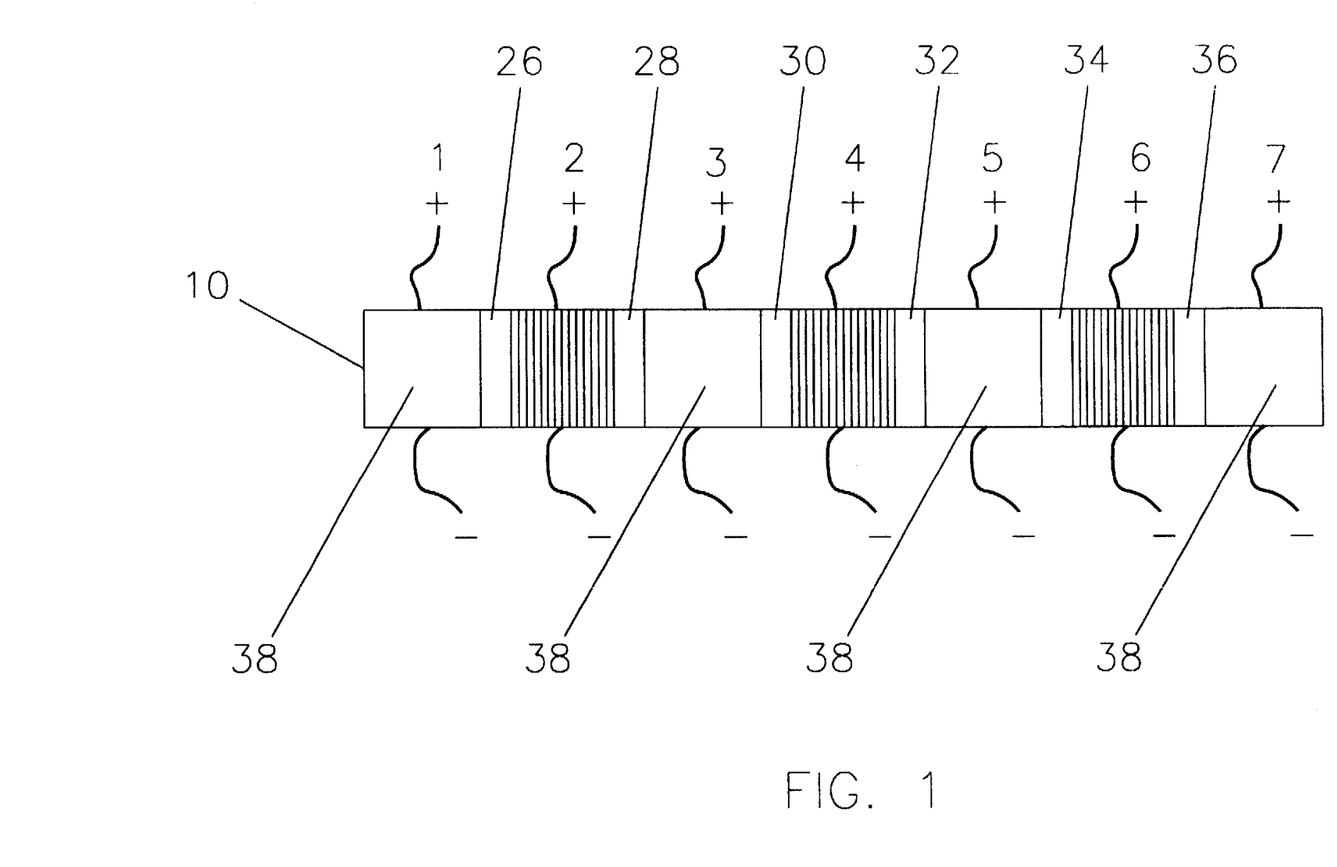
FIG. 1 is a top view of an actuator of an Inchworm® peristaltic motor embodying the invention.
Figure 2:
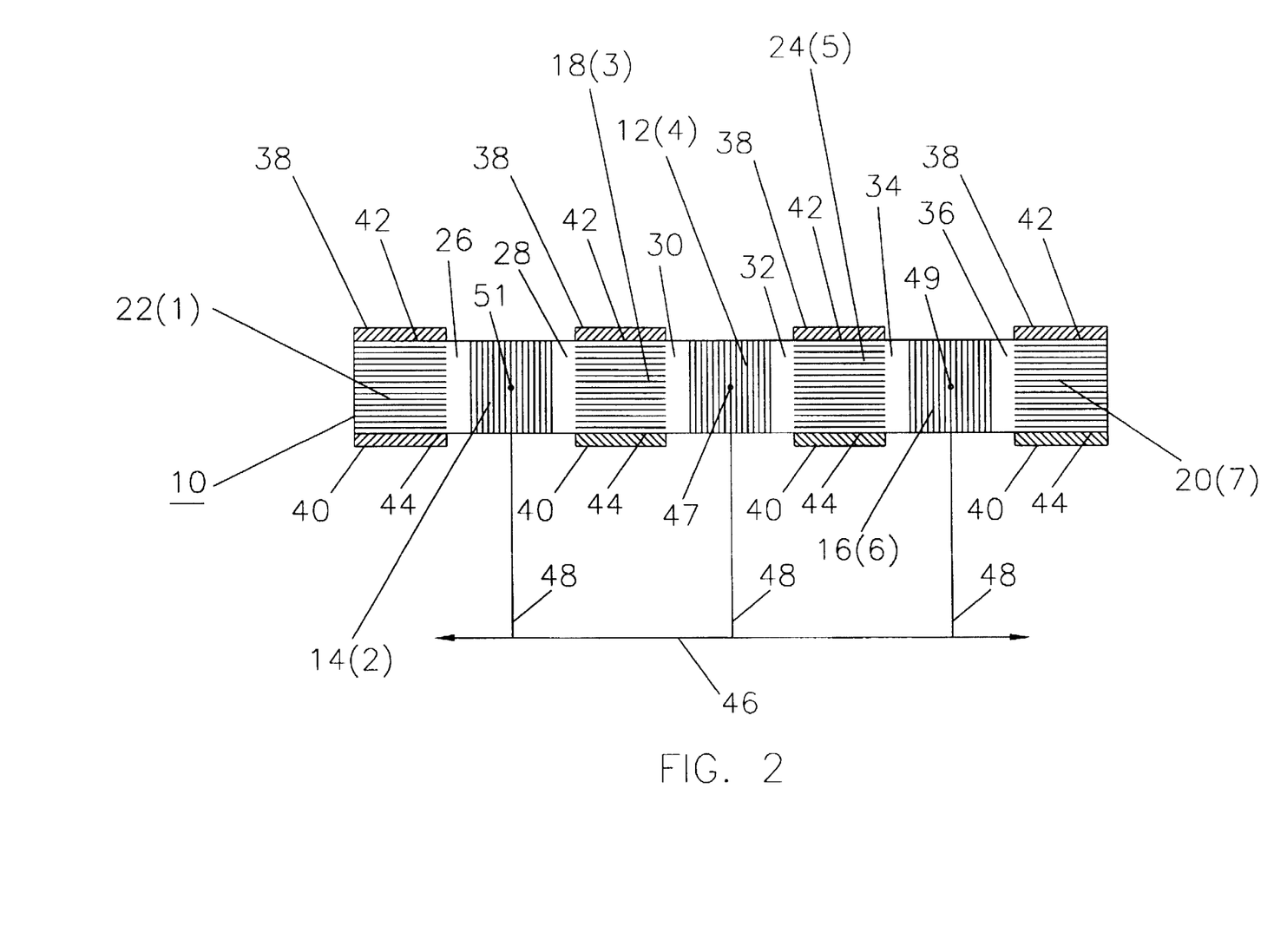
FIG. 2 is a front view of the actuator shown in FIG. 1.
Figure 3:
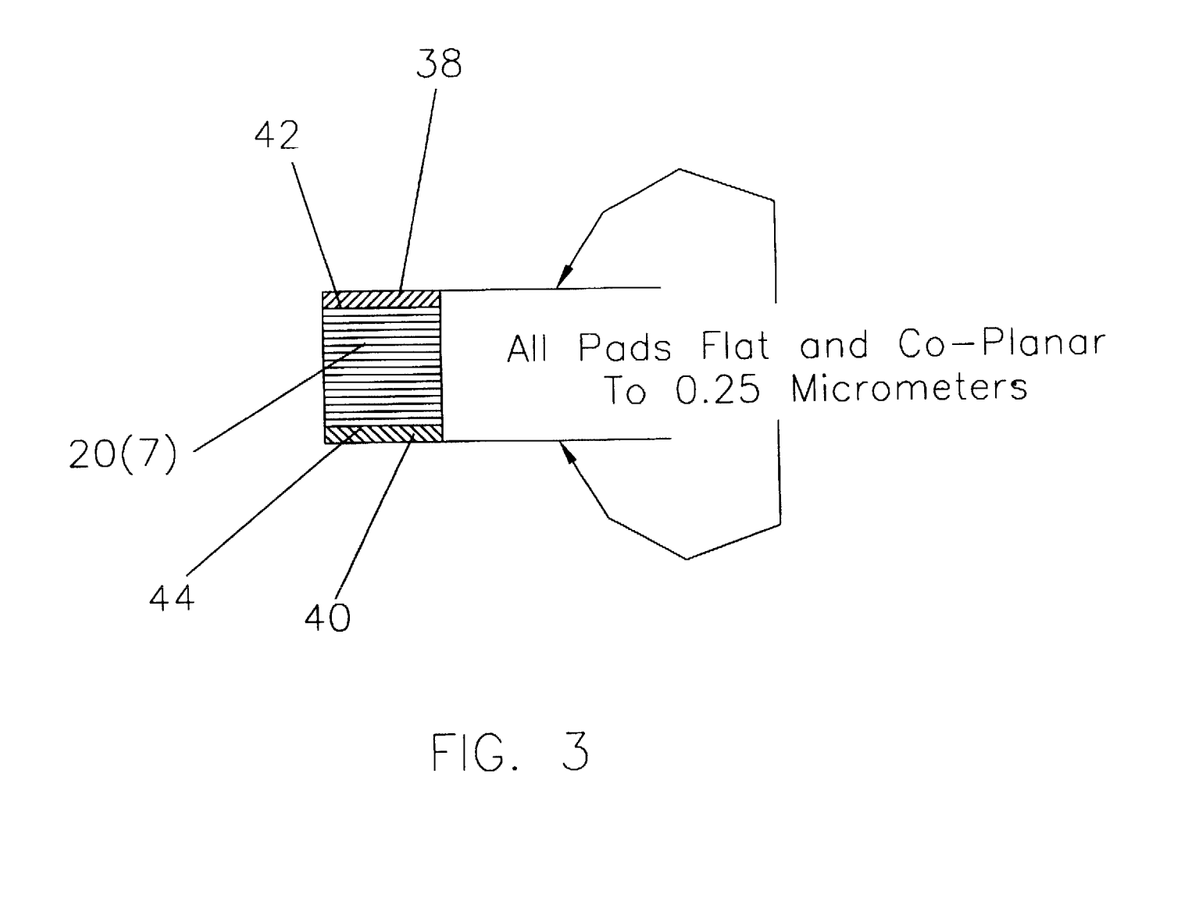
FIG. 3 is an end view of the actuator shown in FIGS. 1 and 2.

Referring to FIGS. 1, 2 and 3, there is shown an actuator 10 which is an assembly of seven sections, namely, pusher sections 12, 14 and 16 and clamping sections 18, 20, 22 and 24. These sections are connected by separation regions 26, 28, 30, 32, 34 and 36 into an integral assembly which constitutes the actuator 10. This integral assembly is preferably a monolithic body, but the pusher and clamping sections may be separated or have cavities at their interface if their mechanical connection at the interface creates fatigue.

Each section, as well as the separation regions, may be made of the same material, preferably a piezoelectric ceramic such as PZT (lead-zirconate-telanate) or electrostrictive material such as PMN (lead magnesium neobate). These materials are sometimes called electroceramic. The clamping and pusher sections are active elements and expand when voltages are applied there across. The ceramic material of each section is preferably in a multiplicity of layers for example about 0.1 mm thick and each with a coating of conductive material, which may be printed thereon. The electrodes on alternate layers are connected to leads which are shown in FIG. 1 as leads 1 through 7 and marked as positive (+) and negative (−) leads. 1 through 7 are also used herein to designate the successive sections 12–24 as explained hereinafter. These leads provide a means for applying operating voltages to the sections so as to cause them to expand. It is well recognized by those skilled in the art that multi-layer sections and the connecting regions between the sections may be manufactured using a variety of processes. The layers, electrodes, and connections may be formed while still in the moldable (green) state and fired in a furnace or kiln to form the integral and monolithic assembly. Another option is to bond together separately fired multi-layer sections. Still another option is to bond together separately fired PZT layers which are then bonded together to form a monolithic actuator. The essential requirement of this monolithic actuator is clamping elements that expand perpendicular to the axial direction which are adjacent to pusher elements that expand in the axial direction. Thus, adjacent sections must move in orthogonal directions. The connection between these sections must not significantly restrict the desired actuator motion while at the same time provide high stiffness and strength in the axial direction.

After the assembly is in a solid monolithic state, the clamping sections 18, 20, 22, and 24 have contact wear pads 38 and 40 for example, of silver, bonded or deposited on the upper and lower surfaces 42 and 44 thereof. These wear pads are machined or lapped flat and coplanar with each other, suitably to a tolerance of approximately 0.25 micrometers. The multi-layer process for achieving thin layers in the pusher and clamping sections is of the type generally used to make thin layer ceramic devices such as capacitors, and further information respecting this process may be obtained from the manufacturers thereof, such as AVX Corp., Hoechst Ceramtec AG, Morgan Matroc Inc., NEC Corp., and Tokin Corp.

The center points 48, 49, and 51 of pusher sections 12, 14, and 16 are connected to a yoke or bracket, for example, which is connected to the object to be moved. Motion is in the axial directions as shown by arrow 46. Coupling to the object being moved is illustrated schematically by lines 48 to arrow 46. Connection to the actuator 10 at multiple points is possible because the center points 48, 49, and 51 maintain fixed relative spacing as the actuator operates. The object may be coupled to less than all of such points, if desired.

The arrangement of the clamp sections 1,3,5, and 7 with respect to the center points 48, 49, and 51 is symmetrical. The symmetrical arrangement places pairs of clamping sections (1:5 and 3:7) on opposite sides of the motion pick-off points 48, 49, and 51 and reduces the motion in the axial direction when the clamping elements are activated. The axial motion produced by the clamps is undesirable and commonly referred to as glitch. Each clamp, in a pair of clamping sections, produces glitch in both positive and negative axial directions so that net glitch is essentially zero when measured at the object being moved by a pusher section between the pair of clamping sections. Connection at three points to actuator 10 also enhances the stiffness and strength of the coupling to the object being moved and provides elastic averaging of the motion variations typically found in PZT materials.

Figure 7:
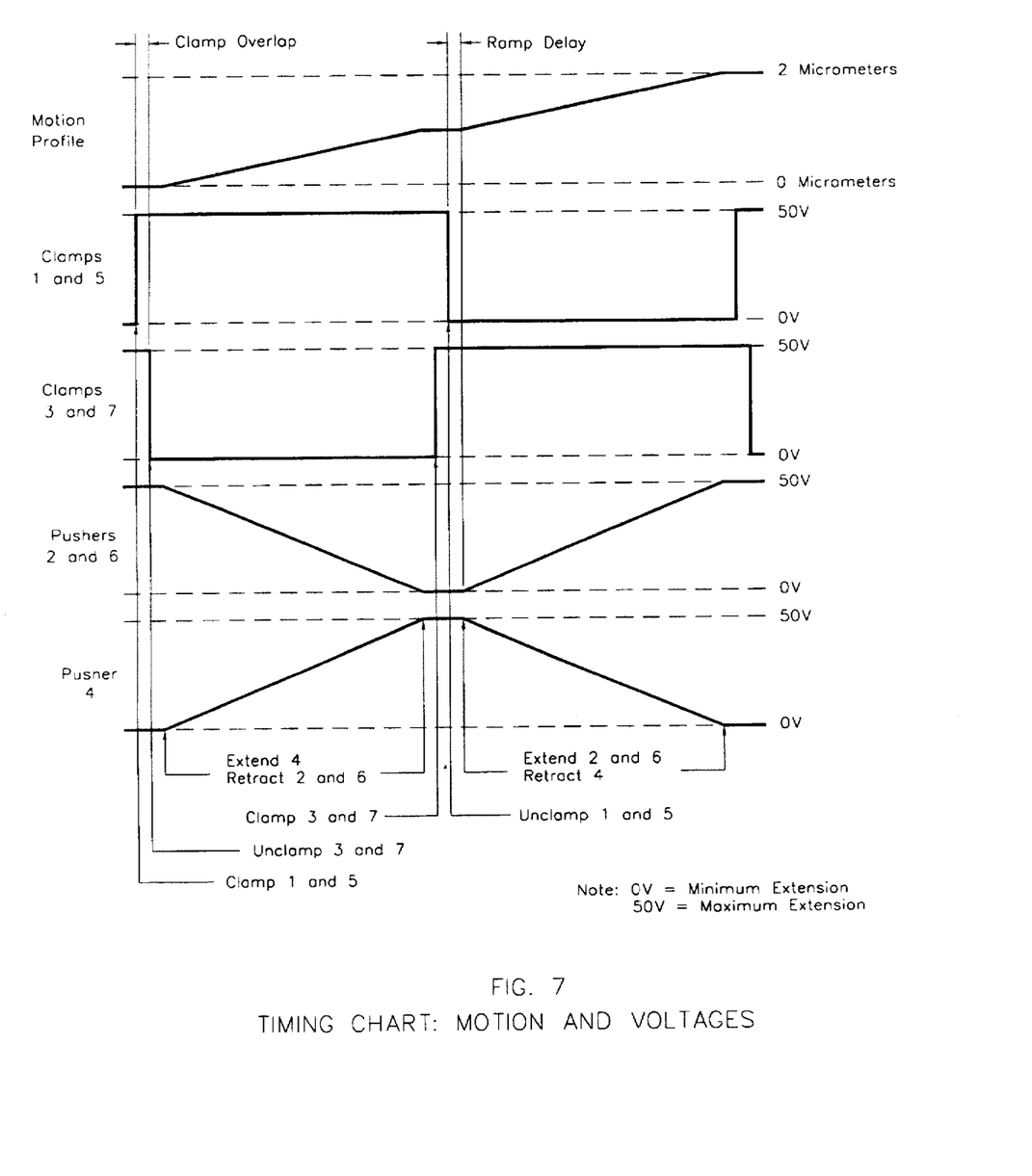
FIG. 7 is a timing chart containing plots of the motion and voltages obtained from and used in the apparatus shown in FIGS. 4 and 5, in each of the operations of the sequence of operations illustrated in FIG. 6.

The sections 22, 14, 18, 12, 24, 16 and 20 are also labeled consecutively and successively from left to right as 1, 2, 3, 4, 5, 6 and 7, respectively. Thus the legends 22(1), 14(2), 18(3), 12(4), 24(5), 16(6), and 20(7) are used. The operating voltages are applied together to the leads for clamping sections 3 and 7 and for clamping sections 1 and 5. The leads to the pusher sections 2 and 6 also have the same signals applied thereto and are actuated simultaneously. The pair of clamping sections 1 and 5 are thus actuated simultaneously as is the other pair of clamping sections 3 and 7. Since the clamping sections are physically ordered as 1-3-5-7 but are actuable in pairs as 1-5 and 3-7, they may be said to be actuably "interleaved." The central pusher section 4 is actuated independently. Accordingly, four operating channels are connected to the leads of the seven sections as via separate amplifiers. The voltages which are applied to each of the channels for the sections 1 and 5, 3 and 7, 2 and 6, and 4 respectively are illustrated in FIG. 7 for a typical cycle of operation of the apparatus.

When voltages are applied, only about fifty volts is needed, which is approximately one tenth the voltage amplitude required to produce significant strain and expansion in the layers of the active material of piezoelectrically operative actuators previously proposed. This reduction in voltage is obtained even though the actuator 10 is a monolithic, one-piece assembly. Thus operation at less than 100 volts, which reduces arcing, is facilitated.

Figure 4:
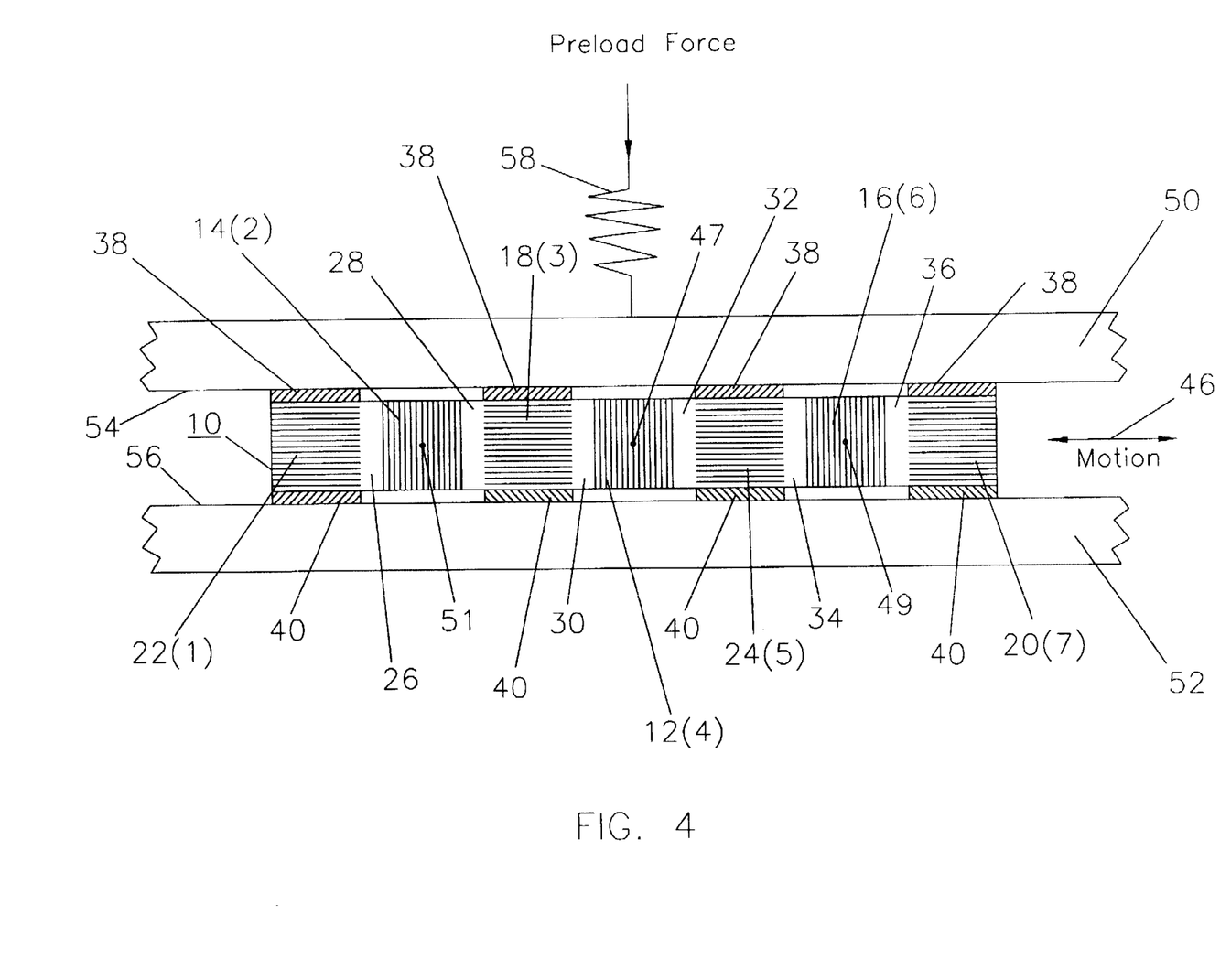
FIG. 4 is a front view of a peristaltic motor incorporating the actuator shown in FIGS. 1, 2 and 3.
Figure 5:
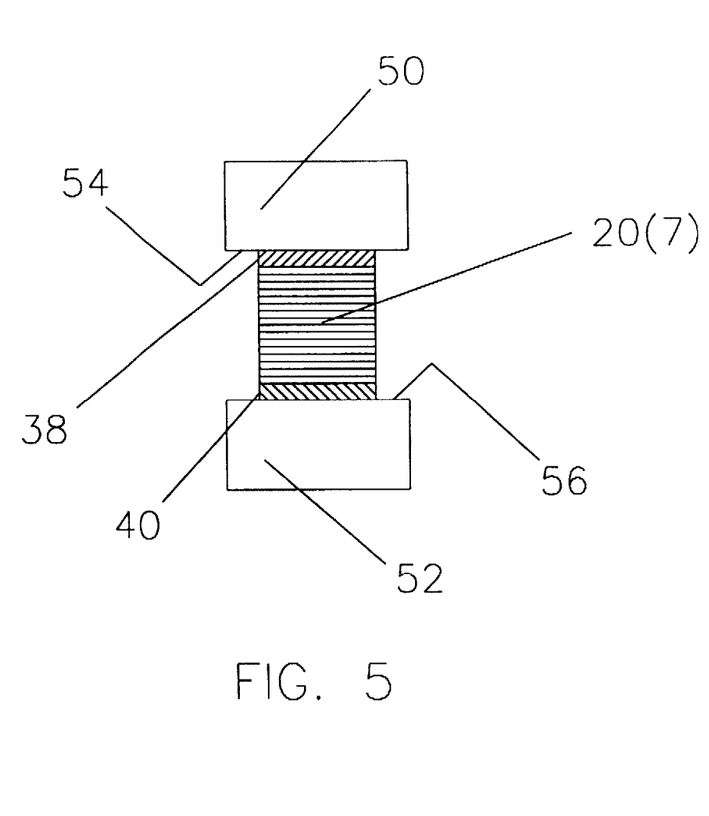
FIG. 5 is an end view of the motor shown in FIG. 4.

Referring to FIGS. 4 and 5, the improved piezoelectric Inchworm® motor is shown. The actuator 10 is located between two fixed members which are shown as rails 50 and 52. Preferably, the rails are made of hard, flat material (for example, alumina). The rails surfaces 54 and 56 are parallel and face each other. They define a pathway in the axial direction 46 for the actuator 10 which moves peristaltically as the interleaved pairs of clamping sections 1 and 5 and 3 and 7 alternately engage the surfaces 54 and 56 in clamping and releasing relationship. The surfaces 54 and 56, like the outer side surfaces of the pads 38 and 40, are desirably machined or lapped flat (suitably to the same tolerance of about 0.25 micrometers).

A low stiffness spring 58 applies a constant bias or spring pre-load against these outer surfaces of the clamping sections. The pre-load depends upon the desired force to be applied to the object to be manipulated and the stiffness and breakdown strength of the actuator 10. Thus, the actuator can be scaled to produce larger or smaller pushing forces on the object. As noted above, the actuator moves between the rails 50 and 52 and the motion and force produced by the actuator is picked-off from the central pusher element 12(4) where the smoothest motion (lowest "glitch") is obtained.

Glitch is a motion discontinuity which is produced because the clamping sections do not produce pure clamping motion in the direction perpendicular to the surfaces 54 and 56. As the clamping sections get longer they also get thinner. This cross-coupling motion is commonly called D33 and D31 motion and is inherent in active materials such as the piezoelectric materials used for the actuator 10. Accordingly, the clamping motion is accompanied by axial motion in the direction of the pick-off points 47, 49, and 51. Inasmuch as the clamps interchange engagement simultaneously on each side of the pick-off points 47, 49, and 51 the axial forces and motion produced at each pair 22(1) and 24(5) and pair 18(3) and 20(7) are in opposite directions and sum to zero at the pick-off points. Glitch is therefore reduced.

The load is transferred from the rails 50 to 52 upon relative motion between the clamping sections 1 and 5 and 3 and 7. This relative motion need only be larger than the difference in flatness of the pads 38 and 40 and the surfaces 54 and 56 of the rails. The clamping sections have only compressive force due to the pre-load force from the spring 58 and the force of their expansion applied thereto. Tensile forces are substantially eliminated.

Even if the operating voltage to the actuator is turned off, the spring bias holds the actuator 10 in place between the rails 50 & 52. The rails may move with respect to each other (the rail 52 may be fixed while the other rail 50 is movable) in a direction perpendicular to the direction of motion 46. Thus the motor is self-compensating for dimensional changes due to thermal expansion and contraction. The pre-load force remains constant with the variation and separation of the rails 50 and 52.

Figure 6:
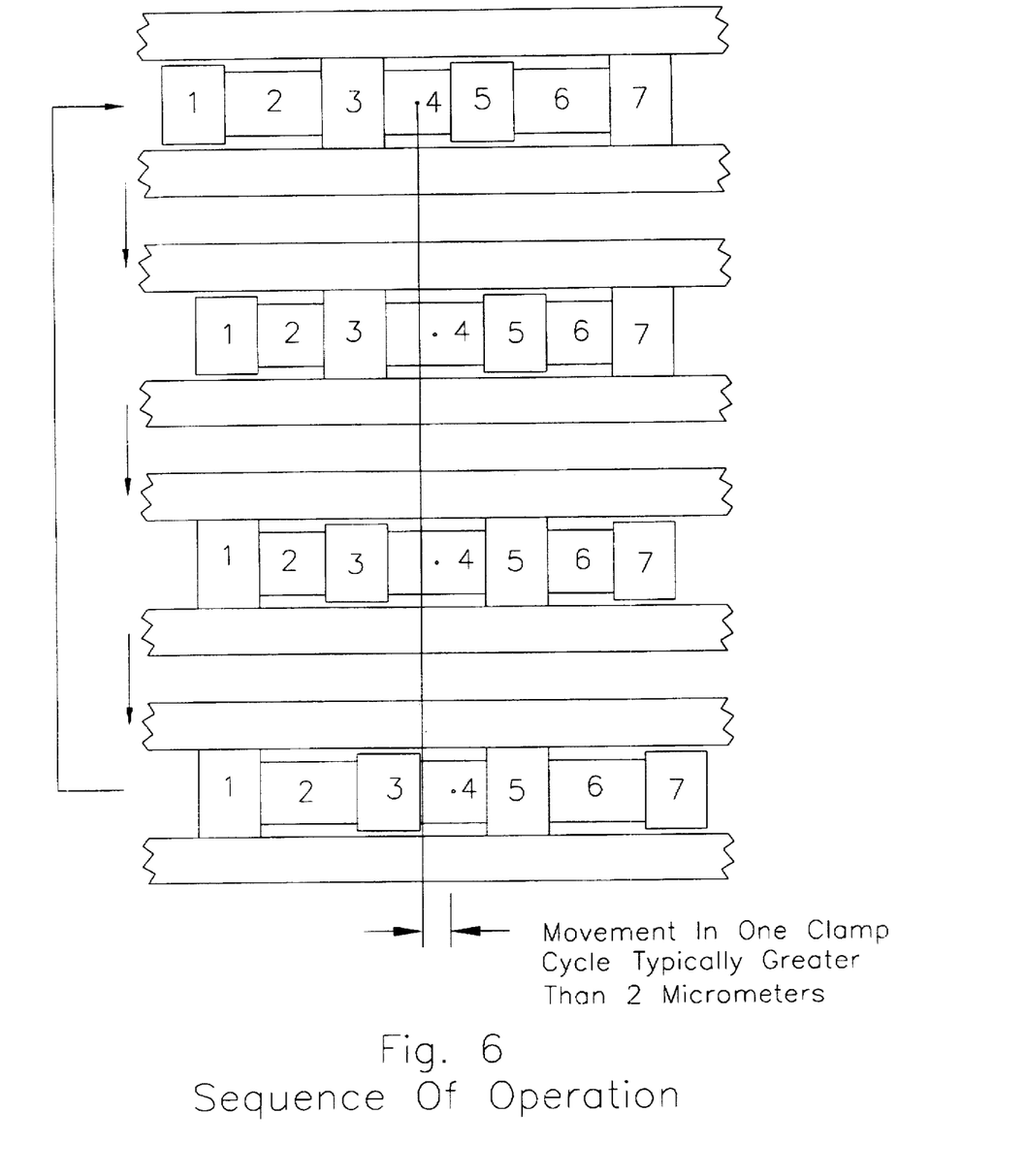
FIG. 6 is a series of schematic presentations of the apparatus shown in FIGS. 4 and 5 and illustrates the sequence of operation thereof.

Referring to FIGS. 6 and 7, there is shown the operating sequence of the motor or actuator over one cycle. The cycles of course repeat. The pairs of clamping elements 1 and 5 and 3 and 7 work together and extend and contract simultaneously as the voltages shown in FIG. 7 are applied thereto. As noted above, there are four amplifier or signal channels which apply the voltages to the clamping sections 1 and 5 and 3 and 7 to the pusher sections 2 and 6 and to the pusher section 4.

When the voltage is first applied, clamping sections 3 and 7 extend while clamping sections 1 and 5 retract. This separates the actuator from the rails 50 and 52 by a sufficient distance (suitably about 2 microns) to eliminate contact of the pads on the sections 1 and 5. The axial force acting on the pads of clamping sections 3 and 7 is the pre-load force due to the spring, multiplied by the coefficient of friction of the interface between the outer surfaces of the pads and the rails. Thus, for a coefficient of friction of 0.25 and a pre-load of 60 Newtons, the axial force would be 15 Newtons.

In the next operation, the pusher elements 2 and 6 retract while the pusher element 4 extends. Their combined motion moves the clamping sections 1 and 5 to the right as shown in FIG. 6 while maintaining a constant separation between the clamping sections 1 and 5.

In the next step in the sequence, clamping sections 1 and 5 extend and after a short delay, clamping sections 3 and 7 are allowed to retract (the voltage there across drops to 0—see FIG. 7). Thus, the axial force on the object is now produced by clamping sections 1 and 5 and clamping sections 3 and 7 become free of the rails.

In the next step in the sequence, pusher sections 2 and 6 are activated and extend while the central pusher section 4 retracts. This moves the clamping sections 3 and 7 to the right. The motions are controlled by controlling the voltages across the pusher sections. Since there are three pusher sections which are activated, the resolution of the movement can be in the nanometer range. The total movement in one cycle is typically slightly greater than 2 microns in the axial direction 46 (FIG. 4.)

From the foregoing description, it will be apparent that there has been provided an improved peristaltic actuator or motor This motor wherein glitch is substantially eliminated and desired axial motion is smoothed is referred to as the Inchworm® when sourced from Burleigh Instruments, Inc. of Fishers, New York, USA. Variations and modifications in the hereindescribed actuator or motor, within the scope of the invention, will undoubtedly suggest themselves to those skilled in the art. Accordingly, the foregoing description should be taken as illustrative and not in a limiting sense.

I claim:

1. Peristaltic apparatus for driving an object which comprises:
   a) a pair of members having surfaces facing each other and defining a path; and
   b) an actuator between said surfaces and movable along said path, said actuator having a first plurality of clamping sections and a second plurality of pusher sections disposed alternately in successive and linear relationship along said path, the number of said clamping sections being greater by one than the number of said pusher sections and the first and last of said sections in said actuator being clamping sections connectable in driving relationship with said object, said clamping sections being alternately actuated in interleaved pairs, means to simultaneously actuate said interleaved pairs to extend into and release from clamping relationship with said surfaces, two of said pusher sections and a clamping section being disposed between the members of each of said interleaved pairs of said clamping sections.

2. The apparatus according to claim 1 wherein the first clamping section of the first of said plurality of pairs of clamping sections is separated by a second one of said pusher sections from the first clamping section of the second of said plurality of pairs of clamping sections, and wherein the second clamping section of the first of said plurality of pairs of clamping sections is separated by a third one of said pusher sections from the second clamping section of the second of said plurality of pairs of clamping sections.

3. The apparatus according to claim 2 further comprising means for extending simultaneously and retracting simultaneously said second and third ones of said pusher sections.

4. The apparatus according to claim 3 further comprising means for extending said first one of said pusher sections when said second and third pusher sections are retracted.

5. The apparatus according to claim 4 further comprising means for retracting said first one of said pusher sections when said second and third pusher sections are retracted.

6. The apparatus according to claim 1 wherein said one pusher section is disposed symmetrically with respect to said pairs of clamping sections and also with respect to a plurality of pusher sections of said actuator.

7. The apparatus according to claim 1 further comprising means for biasing said members against said clamping sections to maintain substantially only compressive forces on said clamping sections when in said clamping relationship and to enable said pusher sections to apply sufficient force to move said object along said path.

8. The apparatus according to claim 7 wherein said biasing means comprises means for applying elastic force to at least one of said members, in a direction transverse to said path.

9. The apparatus according to claim 7 wherein one of said members is movable with respect to the other in a direction to change the spacing between the surfaces thereof and said elastic force applying means have a spring connected to said one member.

10. The apparatus according to claim 1 wherein said sections are an integral assembly extending along said path and providing said actuator.

11. The apparatus according to claim 10 wherein said assembly is a monolithic body of ceramic material wherein said sections are ceramic active material connected by regions of ceramic material.

12. The apparatus according to claim 1 wherein said sections include a plurality of layers of piezoelectric or electrostrictive material having electrodes thereon, said layers of said pusher sections being generally perpendicular to the surfaces of said members, and said layers of said clamping sections being generally parallel to the surfaces of said members in contact therewith.

13. The apparatus according to claim 12 wherein said layers are ceramic material and bodies of ceramic material between said sections define with said sections an integral body providing said actuator.

14. The apparatus according to claim 12 wherein pads are assembled on said clamping sections facing said surfaces to provide said contact therewith.

15. The apparatus according to claim 1 wherein said sections are bodies of piezoelectric or electrostrictive material having electrodes connected thereto for applying voltages thereto for extending the width of said sections in directions toward said surfaces for said clamping sections and in directions along said surfaces for said pusher sections.

16. The apparatus according to claim 1 wherein said pusher sections are each disposed between a pair of clamping sections and are all connected in driving relationship with said object.

17. A method for peristaltically advancing an object a desired distance between two parallel surfaces, comprising the steps of:

a) providing a peristaltic motor having at least seven sections in substantially linear and contiguous array, each section being independently extendable and retractable along its axis to increase and decrease, respectively, its axial length, odd numbered of said sections being clamping sections axially oriented orthogonal to said parallel surfaces, an end one of said clamping sections being also disposed against said object to be advanced, and even numbered of said sections being pusher sections axially oriented parallel to said parallel surfaces;

b) extending said third and seventh sections to clamp said motor between said surfaces, said seventh section also being disposed against said object, said third and seventh sections being interleaved with said first and fifth sections;

c) thereafter retracting said first and fifth sections;

d) thereafter retracting said second section and extending said fourth section to displace said first and fifth sections toward said object to be advanced;

e) thereafter extending said first and fifth sections to clamp said motor between said surfaces;

f) thereafter retracting said third and seventh sections;

g) thereafter retracting said fourth section and extending said sixth section to displace said third and seventh sections to advance said object; and h) thereafter repeating steps b) through h) as many times as needed to advance said object over a desired distance.

* * * * *